(12) United States Patent
Lee (10) Patent No.: US 10,871,073 B2
(45) Date of Patent: Dec. 22, 2020

(54) TURBINE BLADE, TURBINE INCLUDING SAME TURBINE BLADE, AND GAS TURBINE INCLUDING SAME TURBINE

(71) Applicant: DOOSAN HEAVY INDUSTRIES & CONSTRUCTION CO., LTD., Changwon-si (KR)

(72) Inventor: Ik Sang Lee, Suwon-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 245 days.

(21) Appl. No.: 16/034,321

(22) Filed: Jul. 12, 2018

(65) Prior Publication Data

US 2019/0085703 A1 Mar. 21, 2019

(30) Foreign Application Priority Data

Sep. 18, 2017 (KR) .......................... 10-2017-0119561

(51) Int. Cl.
*F01D 5/14* (2006.01)
*F01D 7/00* (2006.01)
(Continued)

(52) U.S. Cl.
CPC ............. *F01D 5/148* (2013.01); *F01D 5/147* (2013.01); *F01D 5/3007* (2013.01); *F01D 7/00* (2013.01);
(Continued)

(58) Field of Classification Search
CPC . F01D 5/148; F01D 5/146; F01D 7/00; F01D 7/02; F05D 2250/90;
(Continued)

(56) References Cited

U.S. PATENT DOCUMENTS 3,042,371 A * 7/1962 Fanti ..................... F04D 29/368
416/132 R
3,834,831 A * 9/1974 Mitchell ................. F01D 5/081
416/95

(Continued)

OTHER PUBLICATIONS http://www.fi-powerweb.com/Engine/T700-GE-401.html "Powerweb General Electric T700-GE-401" citation, downloaded May 7, 2020.*

*Primary Examiner* — Ted Kim
(74) *Attorney, Agent, or Firm* — Invenstone Patent, LLC (57) ABSTRACT

A turbine blade is provided with a rotatable leading edge to reduce pressure loss as a flow direction of combustion gas varies. The turbine blade includes an airfoil including as separate bodies a trailing-edge portion and a leading-edge portion being linked to the trailing-edge portion and disposed upstream of the trailing-edge portion, the leading-edge portion including a front surface arranged on an upstream side of the leading-edge portion; and a rotary unit connected to the leading-edge portion and configured to rotate the leading-edge portion according to an inflow angle of the combustion gas such that the front surface faces a flow of the combustion gas. A barrier wall extends from a side surface of the leading-edge portion toward an open end of the trailing edge portion, and when the leading-edge portion is rotated, the barrier wall portion prevents formation of a gap between the side surface and the open end.

12 Claims, 5 Drawing Sheets

(51) Int. Cl.
   *F01D 5/30* (2006.01)
   *F02C 9/22* (2006.01)
(52) U.S. Cl.
   CPC .......... *F02C 9/22* (2013.01); *F05D 2240/303* (2013.01); *F05D 2250/90* (2013.01); *F05D 2260/57* (2013.01); *F05D 2260/76* (2013.01)
(58) Field of Classification Search
   CPC ............. F05D 2260/74; F05D 2260/76; F05D 2260/57; F05D 2240/303; F02C 3/04; F02C 9/22
   USPC .......................................................... 416/23
   See application file for complete search history.

(56) References Cited

U.S. PATENT DOCUMENTS

| | | | | |
|---|---|---|---|---|
| 3,986,794 | A * | 10/1976 | Korn | F01D 7/00 415/129 |
| 4,053,256 | A * | 10/1977 | Hertel | F01D 17/162 415/161 |
| 6,076,776 | A * | 6/2000 | Breitbach | B64C 3/48 244/219 |
| 2010/0166543 | A1* | 7/2010 | Carroll | F01D 5/146 415/160 |
| 2011/0061579 | A1* | 3/2011 | Van Gelder | F01D 5/148 114/140 |
| 2013/0031913 | A1* | 2/2013 | Little | F01D 5/146 60/796 |
| 2016/0130973 | A1* | 5/2016 | Pachidis | F01D 17/162 415/148 |
| 2018/0066671 | A1* | 3/2018 | Murugan | F01D 7/00 |

* cited by examiner

TURBINE BLADE, TURBINE INCLUDING SAME TURBINE BLADE, AND GAS TURBINE INCLUDING SAME TURBINE

CROSS REFERENCE TO RELATED APPLICATIONS

This application claims the benefit of Korean Patent Application No. 10-2017-0119561, filed on Sep. 18, 2017, in the Korean Intellectual Property Office, the disclosure of which is incorporated herein in its entirety by reference.

BACKGROUND OF THE DISCLOSURE

1. Field of the Disclosure

The present disclosure relates to a turbine blade, a turbine including the same turbine blade, and a gas turbine including the same turbine. More particularly, the present disclosure relates to a turbine blade capable of reducing pressure loss in a turbine casing by adjusting the direction of a leading-edge of the turbine blade in accordance with a flow angle of combustion gas introduced into the turbine casing, relates to a turbine including the same turbine blade, and relates to a gas turbine including the same turbine.

2. Description of the Background Art

A turbine is a rotary mechanical device that rotates by an impulse force of or a reaction force to a flow of compressible fluid such as gas. Turbines are categorized into steam turbines using steam as the compressible fluid and gas turbines using hot combustion gas as the compressible fluid. A gas turbine is mainly composed of a compressor, a combustor, and a turbine. The compressor has an air inlet through which air is taken in and a compressor casing in which a plurality of compressor vanes and a plurality of compressor blades are alternately arranged.

The combustor mixes fuel with the compressed air supplied from the compressor and ignites the fuel-air mixture with a burner to produce high-temperature high-pressure combustion gas. The turbine includes a turbine casing in which a plurality of turbine vanes and a plurality of turbine blades are alternately arranged. A rotor is arranged to extend through the centers of the compressor, the combustor, the turbine, and an exhaust chamber.

This gas turbine does not include a reciprocating mechanism such as a piston, which is usually present in a typical four-stroke engine. Therefore, it has no mutually frictional parts such as a piston-cylinder combination, thereby consuming an extremely small amount of lubricating oil and reducing the amplitude of vibration, which results in high speed operability.

In the operation of the gas turbine, air is first compressed by the compressor and then mixed with fuel. Then, the fuel-air mixture is burnt to produce combustion gas, which is then discharged to the turbine. By passing through the vane and blade arrangement, the combustion gas causes a rotary force which rotates the turbine rotor.

An example of a contemporary technology related to a turbine of a gas turbine is disclosed in Korean Utility Model No. 20-0174662. In such a gas turbine, the flow angle of combustion gas introduced into the turbine casing from the combustor during operation of the gas turbine is not constant but changes. Therefore, when the flow of combustion gas which changes in its flow angle meets a turbine blade which has a fixed angle, pressure loss occurs, resulting in decreases in the efficiency and output power of the gas turbine.

SUMMARY OF THE DISCLOSURE

Accordingly, the present disclosure has been made in view of the problems occurring in the related art. In order to solve the problems, the present disclosure is intended to provide a turbine blade with a rotatable leading-edge portion which can reduce pressure loss as a flow direction of combustion gas varies. The present disclosure is also intended to provide a turbine including the same turbine blade, and a gas turbine including the same turbine.

In order to accomplish the above objects, one aspect of the present disclosure provides a turbine blade mounted on a turbine disk in a turbine casing of a turbine, the turbine blade rotating the turbine when combustion gas flows in the turbine casing. The turbine blade may include an airfoil including as separate bodies a trailing-edge portion and a leading-edge portion being linked to the trailing-edge portion and disposed upstream of the trailing-edge portion, the leading-edge portion including a front surface arranged on an upstream side of the leading-edge portion; and a rotary unit connected to the leading-edge portion and configured to rotate the leading-edge portion according to an inflow angle of the combustion gas such that the front surface faces a flow of the combustion gas.

The trailing-edge portion may include an open end linked to the leading-edge portion and a closed end having a streamlined shape.

The turbine blade may further include a barrier wall portion extending from a side surface of the leading-edge portion toward the open end of the trailing edge portion, and when the leading-edge portion is rotated, the barrier wall portion may prevent formation of a gap between the side surface of the leading-edge portion and the open end of the trailing-edge portion.

The barrier wall portion may include a first wall having an end configured to contact an inside surface of the open end of a first side of the trailing-edge portion and a second wall having an end disposed in contact with an inside surface of the first end of a second side of the trailing-edge portion, and the end of each of the first wall and the second wall may have a shape corresponding to a periphery of the open end of the trailing-edge.

The leading-edge portion may further include a rear surface arranged toward the open end of the trailing-edge portion, and the front and rear surfaces of the leading-edge portion may have semicircular cross-sections with different radii. The rear surface may have a larger radius than the front surface.

The side surface of the leading-edge portion may include a boundary between the front and rear surfaces, and the barrier wall portion may be connected to the leading-edge portion at the boundary.

The turbine blade may further include a root member for coupling the airfoil to the turbine disk; and a platform formed on an upper portion of the root member and configured to receive the airfoil in an oblong cavity formed on an upper surface of the platform.

The trailing-edge portion of the airfoil of the turbine blade may be fixed in the oblong cavity.

The rotary unit may include a mounting end coupled to the leading-edge portion of the airfoil of the turbine blade; a servo motor configured to rotate the leading-edge portion of the airfoil of the turbine blade in forward and reverse directions; and a controller configured to control operation of the servo motor according to the inflow angle of the combustion gas.

The turbine blade may further include a sensor to measure the inflow angle of the combustion gas at the front surface of the leading-edge portion and to output information indicative of the measured inflow angle to the controller.

The servo motor may, under control of the controller, rotate the leading-edge portion according to a flow direction of combustion gas striking the front surface of the leading-edge portion.

According to another aspect of the present disclosure, there is provided a turbine for generating driving force to be used for generation of electric power by passing a combustion gas supplied from a combustor. The turbine may include a turbine casing in which the combustion gas flows; and a turbine rotor rotatable inside the turbine casing, the turbine rotor including a plurality of turbine disks and a plurality of turbine blades coupled to an outer surface of each of the plurality of turbine disks. The plurality of turbine blades may include the above turbine blade.

According to another aspect of the present disclosure, a gas turbine may include a compressor to produce compressed air by taking in air and compressing the intake air; a combustor to produce combustion gas by burning a mixture of fuel and the compressed air supplied from the compressor; and the above turbine rotatable by the combustion gas supplied from the combustor.

The turbine blade, the turbine, and the gas turbine according to the present disclosure have an advantage of improving output power and efficiency of the gas turbine by reducing pressure loss that occurs when the working fluid comes into contact with the turbine blade, by rotating the leading-edge of the airfoil of the turbine blade in accordance with the flow direction of the combustion gas introduced into the turbine casing, because the flow direction of the combustion gas introduced into the turbine casing varies continuously.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

Hereinafter, a turbine blade, a turbine including the turbine blade, and a gas turbine including the turbine, according to the present disclosure, will be described with reference to the accompanying drawings.

Figure 1:
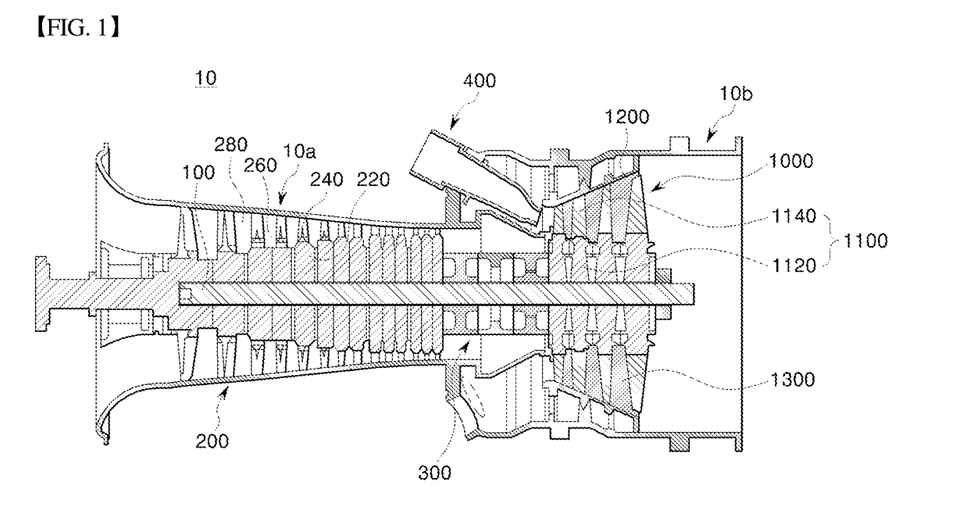
FIG. 1 is a cross-sectional schematic diagram of a gas turbine including a turbine blade according to one embodiment of the present disclosure.

Referring to FIG. 1, a gas turbine 10 according to the present disclosure includes a tie rod 100, a compressor 200, a torque tube 300, a combustor 400, and a turbine 1000. The tie rod 100 is a rod-shaped member passing through the center of the gas turbine 10. The tie rod 100 serves to fasten together the compressor 200 and the turbine 1000.

The gas turbine 10 includes a housing 10a and a diffuser 10b that is provided at a rear end of the housing 10a and through which the combustion gas passing through the turbine 1000 is discharged from the gas turbine. The combustor 400 is disposed in front of the diffuser 10b and burns fuel by receiving compressed air supplied from the compressor 200.

In terms of the flow direction of the compressed air, the compressor 200 is situated on the upstream side of the housing 10a and the turbine 1000 is situated on the downstream side of the housing 10a. Preferably, the torque tube 300 for transferring torque generated by the turbine 1000 to the compressor 200 is installed between the compressor 200 and the turbine 40.

The compressor 200 is provided with a plurality of (for example, fourteen) compressor disks 220, and the compressor disks 220 are assembled with the tie rod 100 so as not to be spaced apart from each other in the axial direction of the tie rod 100. The tie rod 100 passes through the centers of the compressor disks 220, which are thus arranged axially along the tie rod 100. One end of the tie rod 100 may be coupled the most upstream rotor disk and the other end may be fixed to the torque tube 300. Relative rotation is prevented between adjacent compressor disks 220, which are in pressure contact with each other.

A plurality of compressor blades 240 are radially coupled to an outer circumferential surface of each compressor disk 220. Each compressor blade 240 is coupled to the corresponding compressor disk 220 via a compressor blade root member 260.

Compressor vanes 280 are fixed to the housing 10a and arranged so as alternate with the compressor disks 220. Unlike the compressor disks 220, the compressor vanes 280 are stationary (fixed) members and do not rotate. The compressor vanes 280 regulate and guide the flow of compressed air passing the compressor blades 240 coupled to the compressor disks 220, so that the compressed air can be directed at the downstream compressor blades 240.

There are two types of compressor blade root members 260: the tangential type and the axial type. The type of compressor blade root member may be determined according to the structure of a gas turbine used. Typical compressor blades root members have a dove-tail structure or a fir-tree structure. Alternatively, the compressor blades may be coupled to the compressor rotor disk by means of different types of coupling member, such as, a key or a bolt.

The combustor 400 mixes the compressed air with fuel and burns the air-fuel mixture to produce high-temperature high-pressure combustion gas. The combustion process is performed under constant pressure so that the temperature of the combustion gas is increased to a heat-resistant temperature of the components of the combustor and the components of the turbine.

The combustor of the gas turbine may be made up of a plurality of combustors provided as a plurality of cells in a casing. Each combustor includes a burner having a fuel injection nozzle and the like, a combustor liner defining a combustion chamber, and a transition piece serving as a connector between the combustion chamber and the turbine.

Particularly, the combustor liner provides a combustion zone in which the fuel injected through the fuel nozzle and the compressed air supplied from the compressor are mixed and burnt. In the combustor, the combustor liner encloses the combustion chamber in which a fuel and air mixture is combusted, and a flow sleeve surrounds the combustor liner to form an annulus space between the combustor liner and the flow sleeve. A fuel nozzle assembly is coupled to a front end (i.e., upstream end) of the combustor liner, and a spark igniter plug is installed in the side of the combustor.

The transition piece is connected to a rear end (i.e., downstream end) of the combustor liner to deliver the combustion gas, produced in the combustion chamber after the flame is started by the spark igniter plug, to the turbine. Cooling of the outer surface of the transition piece is provided to prevent the transition piece from being damaged by the high temperature combustion gas. The cooling of the transition piece is performed by a portion of the compressed air supplied from the compressor.

To this end, the transition piece is provided with cooling holes through which the compressed air is injected into the transition piece. The air used to cool the combustion piece flows toward the combustor liner.

The air used for cooling the transition piece flows through the annulus space provided between the combustor liner and the flow sleeve. In addition, a portion of the compressed air for cooling also may be externally introduced into the annulus space through cooling holes formed in the flow sleeve to flow along the outer surface of the combustor liner. This incoming air introduced through the cooling holes formed in the flow sleeve and the outgoing air passing through the transition piece may collide with each other in the annulus space.

The high-temperature high-pressure combustion gas ejected from the combustor 400 is introduced into the turbine 1000. The supplied high-temperature high-pressure combustion gas expands in the turbine 1000 and gives a reaction force or impulse force to the blades of the turbine to generate the torque. The torque is transmitted to the compressor 200 via the torque tube 300 described above. The excessive power exceeding the power required to drive the compressor is used to drive an electric generator or the like.

The turbine 1000 and the compressor 200 are similar in their structure. The turbine 1000 includes a plurality of turbine rotors 1100 made up of a plurality of turbine disks 1120 and a plurality of turbine blades 1140 coupled to each of the turbine disks 1120.

The multiple turbine blades 1140 are coupled to the outer surface of each of the turbine disks 1120. The multiple turbine disks 1120 are fitted on the outer circumferential surface of the tie rod 100 and are rotated by the combustion gas supplied from the combustors 400.

The turbine blades 1140 are coupled to the turbine disk 1120 in a dovetail connection manner. The multi-stage turbine disks 1120 are fitted on the outer circumferential surface of the tie rod 100. The turbine also includes a turbine casing 1200, and multiple turbine vanes 1300 are arranged between the turbine blades 1140 and fixed to the turbine casing 1200. The turbine vanes 1300 guide the flow of the combustion gas passing through the turbine blades 1140.

The multiple turbine vanes 1300 are arranged in multiple rows. Each row of turbine vales 1300 are arranged in a circumferential direction of the turbine casing 1200. The turbine vanes 1300 and the turbine blades 1140 are arranged alternately in the axial direction of the tie rod 100 and positioned to be misaligned with each other.

Figure 2:
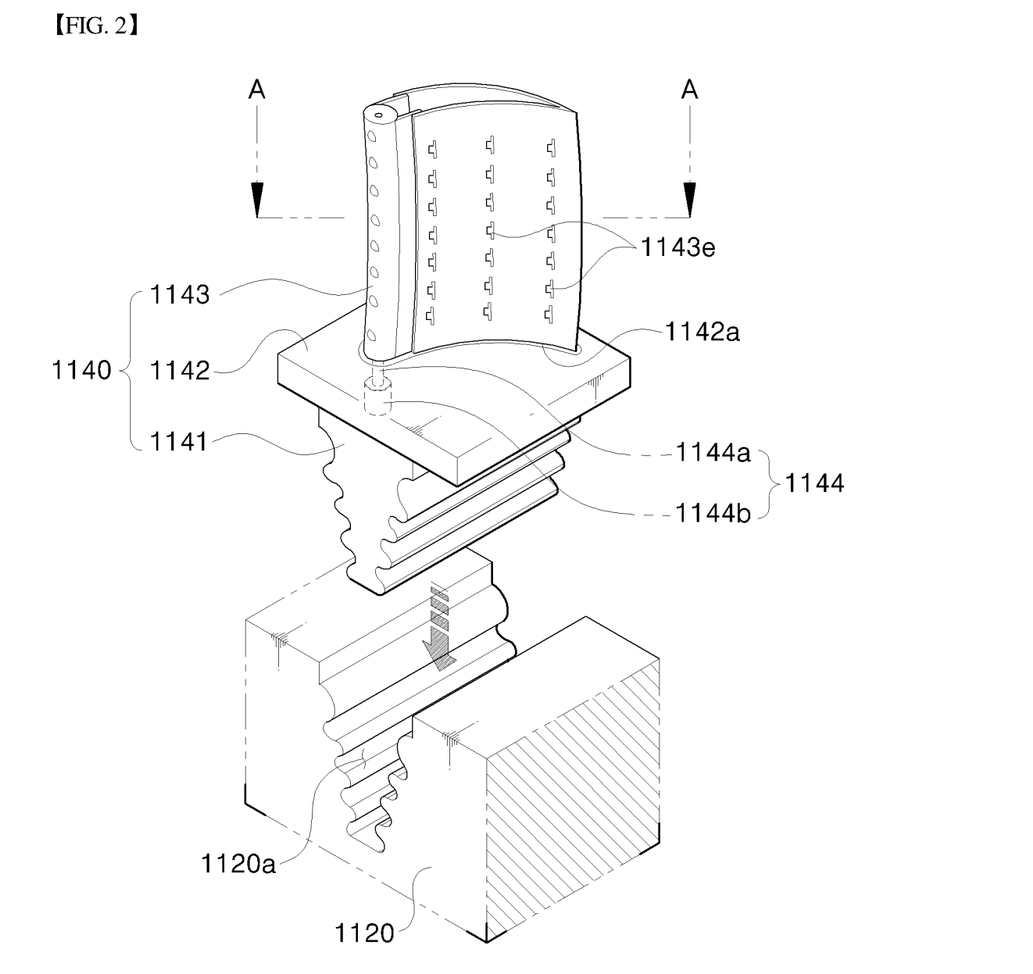
FIG. 2 is a perspective view of the turbine blade and a turbine disk of the gas turbine of FIG. 1.

Referring to FIGS. 1 and 2, each of the turbine blades 1140 mounted in multiple rows and installed inside the turbine casing 1200 includes a turbine blade root member 1141, a platform 1142, a turbine blade airfoil 1143, and a rotary unit 1144.

The turbine blade root member 1141 is coupled to the turbine disk 1120 and the platform 1142 is coupled to an upper portion of the turbine blade root member 1141. Opposing sides of adjacent platforms 1142 abut to maintain a proper spacing between the adjacent turbine blades.

The present invention is not limited to use with an axial-type turbine blade root member 1141 and may be applied to a tangential-type such that the turbine blade will be inserted in an axial direction into a slot 1120a of the turbine disk, which is formed on the outer circumferential surface of the turbine disk 1120.

The turbine blade root member 1141 has a substantially fir-tree shape engageable in a correspondingly shaped turbine disk slot 1120a. Here, the coupling structure of the turbine blade root member 1141 does not necessarily have a fir-tree shape and may have a dovetail shape.

The turbine blade airfoil 1143 is provided on the upper surface of the platform 1142. The turbine blade airfoil 1143 is formed to have an airfoil shape optimized according to the specification of the gas turbine 10. The turbine blade airfoil 1143 may be divided into a leading-edge portion 1143a, which is disposed at the front end and faces the incoming combustion gas flow, and a trailing-edge portion 1143b which is in close contact with the leading-edge portion 1143a at an end thereof. The leading-edge portion 1143a and trialing-edge portion 1143b are provided in the turbine blade airfoil 1143 as separate bodies that are linked to each other. The leading-edge portion 1143a is disposed upstream of the trailing-edge portion 1143b so as to face in the opposite direction of the inflow of combustion gas in the turbine casing 1200. That is, the leading edge portion 1143a includes a front surface 1143a' (described later) arranged on an upstream side of the leading-edge portion 1143a.

The turbine blades 1140 of the turbine 1100 come into direct contact with the high-temperature high-pressure combustion gas, unlike the compressor blades 200 of the compressor 200. The combustion gas has a temperature of about 1700° C., and thus a means for cooling the turbine is necessary. For this reason, the gas turbine according to the present disclosure preferably includes cooling channels for supplying a portion of the compressed air supplied from the compressor 1100 to the turbine blade 1140 of the turbine 1100.

Referring to FIG. 2, multiple film cooling holes 1143e are formed on the surface of the turbine blade airfoil 1143 of the turbine blade 1140. The film cooling holes 1143e are in communication with the cooling channels (not illustrated) formed in the turbine blade airfoil 1143 such that the air can be supplied to the surface of the turbine blade airfoil 1143.

Figure 3:
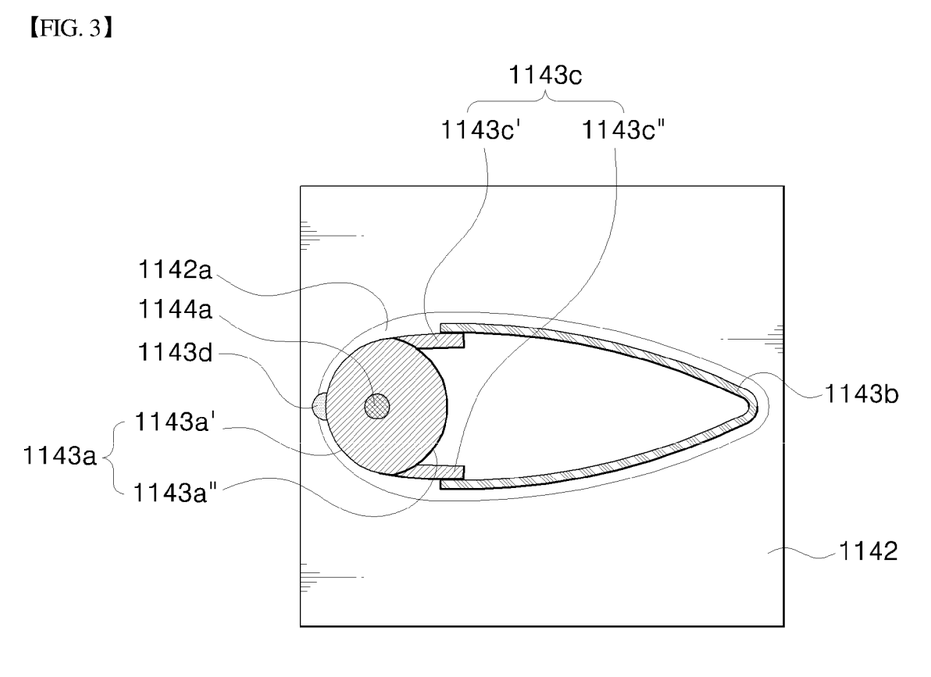
FIG. 3 is a cross-sectional view taken along a line A-A of FIG. 2.
Figure 4:
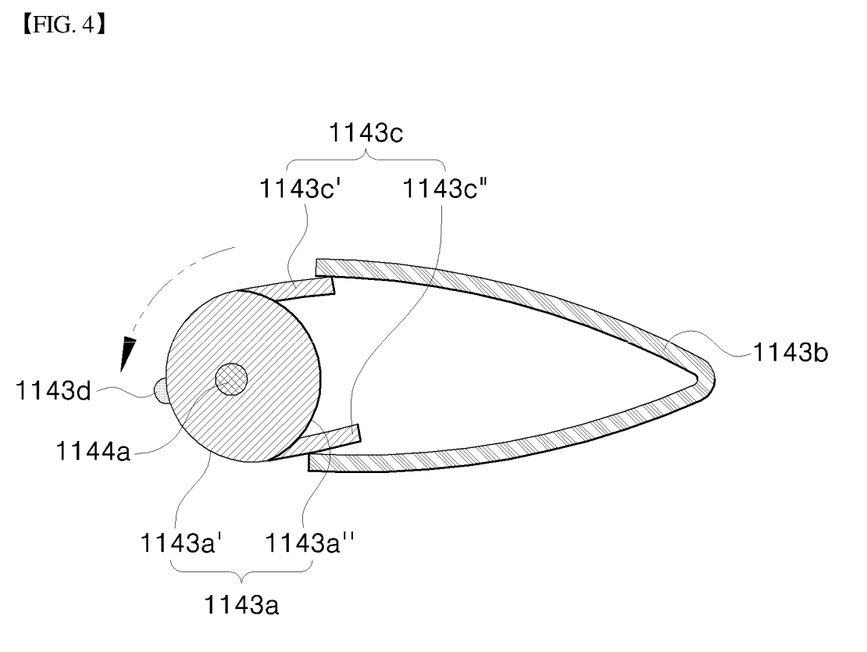
FIGS. 4 and 5 are schematic diagrams for illustrating states in which a leading-edge of the turbine blade of FIG. 3 is rotated.
Figure 5:
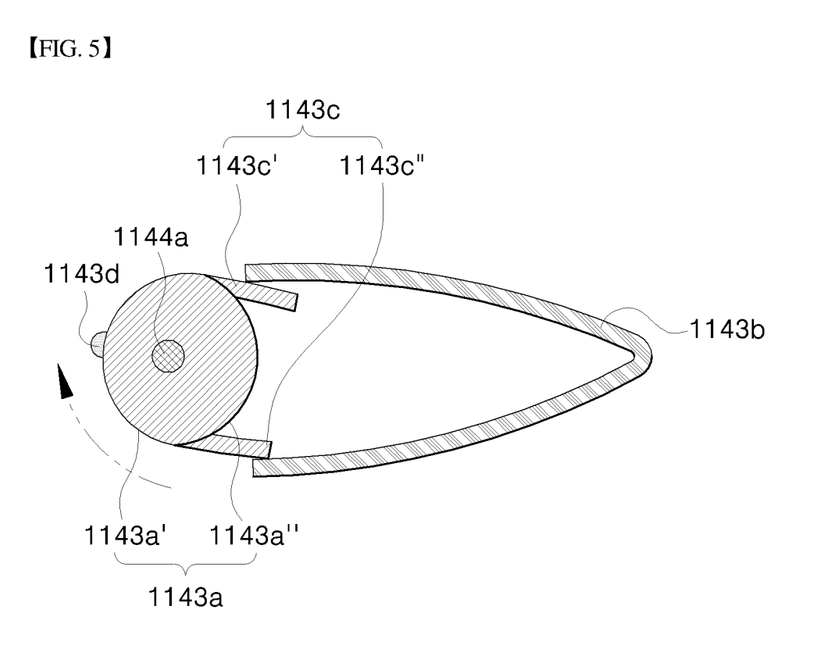

Referring to FIGS. 3 to 5, the turbine blade airfoil 1143 includes the leading-edge portion 1143a, the trailing-edge portion 1143b, and a barrier wall portion 1143c. The leading-edge portion 1143a is disposed on the upstream side (i.e. front side) of the turbine blade airfoil 1143 in terms of the combustion gas flow direction. The trailing-edge portion 1143b has a first end that is an open end and a second end that is a closed end. The trailing-edge portion 1143b has a streamlined shape such that its width gradually decreases toward the second end (closed end) of the trailing-edge portion 1143b. The first end of the trailing-edge portion 1143b is linked to the leading-edge portion 1143a. The leading-edge portion 1143a can be rotated by a rotary unit 1144 (described later) in accordance with the flow direction of the combustion gas flowing into the turbine casing 1200. The trailing-edge portion 1143b does not rotate and is fixed in an oblong cavity 1142a formed in the platform 1142.

The leading-edge portion 1143a is equipped with a sensor 1143d. The sensor 1143d measures an inflow angle (hereinafter also referred to as an angle of a flow direction) of the combustion gas flowing toward the leading-edge portion 1143a. The rotary unit 1144 (described later) rotates the leading-edge portion 1143a in accordance with the angle of the flow direction of the combustion gas. It is preferable that the sensor 1143d is a flow rate sensor or the like and measures the inflow angle of the combustion gas.

The barrier wall portion 1143c is connected to a side surface of the leading-edge portion 1143a. That is, the barrier wall portion 1143c extends from the side surface of the leading-edge portion 1143a toward the open end of the trailing edge portion 1143b. Thus, the barrier wall portion 1143c extends to close a gap between the side surface of the leading-edge portion 1143a and the first end of the trailing-edge portion 1143b when the leading-edge portion 1143a is rotated.

The leading-edge portion 1143a includes a front surface 1143a' and a rear surface 1143a". The front surface 1143a' is located on the front side (i.e., upstream side in view of the flow direction of the combustion gas) of the leading-edge portion 1143a, and the rear surface 1143a" is linked to the first end (open end) of the trailing-edge portion 1143b. It is preferable that the front surface 1143a' and the rear surface 1143a" have semicircular cross-sections with different (unequal) radii. Particularly, the rear surface 1143a" may have a radius larger than that of the front surface 1143a'. Since the front surface 1143a' and the rear surface 1143a" each has a semicircular cross-section, the leading-edge portion 1143a may be smoothly rotated with its side surface being linked to the trailing-edge portion 1143b, thereby enabling a laminar flow of the combustion gas adhering to the side surfaces of the trailing-edge portion.

The barrier wall portion 1143c includes a first (suction side) wall 1143c' and a second (pressure side) wall 1143c". First ends of the first wall 1143c' and the second wall 1143" are each connected to the leading-edge portion 1143a at a boundary between the front surface 1143a' and the rear surface 1143". The boundary is respectively formed on opposite sides of the leading-edge portion 1143a. Thus, the boundary occurs at the side surface of the leading-edge portion 1143a. A second end of the first wall 1143c' is disposed to be in contact with an inside surface of a first side (suction side) of the trailing-edge portion 1143b and a second end of the second wall 1143" is disposed to be in contact with an inside surface of a second side (pressure side) of the trailing-edge portion 1143b.

In FIG. 4, an arrow indicates a first rotational direction of the leading-edge portion 1143a (counterclockwise in FIG. 4). When the leading-edge portion 1143a rotates, for example, in the first direction, a first side surface (top side in FIG. 4) of the leading-edge portion 1143a moves away from the first end (open end) of the suction side of the trailing-edge portion 1143b. At this time, the first wall 1143c' moves, following the movement of the first side surface of the leading-edge portion 1143a, to prevent formation of a gap between the leading-edge portion 1143a and the trailing-edge portion 1143b, thereby preventing the combustion gas from entering into the internal space of the turbine blade 1140. A first and second end of each of the first and second walls 1143c' and 1143c" preferably has a shape corresponding to a periphery of the first and second end of the suction-side portion or the pressure-side portion of the trailing-edge portion 1143b.

The leading-edge portion 1143a is rotated by the rotary unit 1144. Preferably, the rotary unit 1144 is built in the platform 1142. The rotary unit 1144 includes a mounting end 1144a, a servo motor 1144b, and a controller (not shown).

The mounting end 1144a may be disposed so as to engage with a mounting hole (not shown) provided in a bottom center of the leading-edge portion 1143a. The mounting end 1144a is connected to the servo motor 1144b, and the servo motor 1144b rotates the mounting end 1144a in a forward or reverse direction according to the flow direction of the combustion gas. The leading-edge portion 1143a is rotated when the servo motor 1144b is activated and controlled, that is, when rotation the servo motor 1144b is controlled by the controller (not illustrated) in accordance with the sensed flow direction of the combustion gas.

Application of the present disclosure is not limited to the leading-edge portion 1143a of the turbine blade 1140 but the present disclosure also may apply to a diffuser strut that comes into contact with the combustion gas flowing into the turbine casing. That is, the leading-edge portion of the diffuser strut may also be rotated based on the same operation principle as the leading-edge portion 1143a of the turbine blade airfoil 1143.

As described above, the turbine disk 1120 is a rotating body that rotates together with the turbine blade 1140 when the turbine blade 1140 rotates due to the force of the combustion gas. The turbine vane 1300 is fixed to the turbine casing 1200. That is, the turbine vane 1300 is a fixed body that is stationary regardless of the rotation of the turbine blade 1140. The combustion gas travels past the turbine blades 1140 and, in doing so, pushes the turbine blades 1140, to thereby rotate the turbine blade 1140 and the turbine disk 1120 rotate about the tie rod 100 serving as a central axis. The passing combustion gas is guided in the flow direction by the turbine vanes 1300 and is then discharged to the outside through the diffuser 10b.

The inflow angle of the combustion gas flowing into the turbine casing 1200 of the turbine 1000 is not constant but varies. Therefore, the leading-edge portion of the turbine blade 1140 is rotated according to the inflow angle of the combustion gas flowing into the turbine casing 1200, thereby reducing the pressure loss generated when the flow gas comes into contact with the turbine blade 1140 and improving the output power and efficiency of the gas turbine 10.

While the present disclosure has been described with reference to exemplary embodiments, those skilled in the art will appreciate that the exemplary embodiments are presented only for illustrative purposes and the present disclosure is not limited to the disclosed exemplary embodiments. On the contrary, it will be understood that various modifications and equivalents thereof are possible. Accordingly, the true technical protection scope of the present disclosure should be determined by the technical idea defined in the appended claims.

What is claimed is:

1. A turbine blade mounted on a turbine disk in a turbine casing of a turbine, the turbine blade rotating the turbine when combustion gas flows in the turbine casing, the turbine blade comprising:
    an airfoil including as separate bodies a trailing-edge portion and a leading-edge portion being linked to the trailing-edge portion and disposed upstream of the trailing-edge portion, the trailing-edge portion including first and second sides opposing each other and forming an open end linked to the leading-edge portion and a closed end having a streamlined shape, the leading-edge portion including a front surface arranged on an upstream side of the leading-edge portion;

a rotary unit connected to the leading-edge portion and configured to rotate the leading-edge portion according to an inflow angle of the combustion gas such that the front surface faces a flow of the combustion gas; and a generally U-shaped barrier wall portion configured to prevent formation of a gap between the open end of the trailing-edge portion and either of a first side surface of the leading-edge portion and a second side surface of the leading-edge portion, the generally U-shaped barrier wall portion comprising:

a first wall having an upstream portion exposed to the combustion gas and protruding axially from the first side surface of the leading-edge portion toward the open end of the trailing-edge portion and including a first distal end and inner and outer surfaces joined at the first distal end, the outer surface of the first wall configured to contact an inside surface of the first side of the trailing-edge portion; and a second wall having an upstream portion exposed to the combustion gas and protruding axially from the second side surface of the leading-edge portion toward the open end of the trailing-edge portion and including a second distal end and inner and outer surfaces joined at the second distal end, the outer surface of the second wall configured to contact an inside surface of the second side of the trailing-edge portion.

2. The turbine blade according to claim 1, wherein the distal end of each of the first wall and the second wall has a shape corresponding to a periphery of the open end of the trailing-edge.

3. The turbine blade according to claim 1, wherein the leading-edge portion further includes a rear surface arranged toward the open end of the trailing-edge portion, and the front and rear surfaces of the leading-edge portion have semicircular cross-sections with different radii.

4. The turbine blade according to claim 3, wherein the rear surface has a larger radius than the front surface.

5. The turbine blade according to claim 3, wherein each the side surface of the leading-edge portion includes a boundary between the front and rear surfaces, and the barrier wall portion is connected to the leading-edge portion at the boundary.

6. The turbine blade according to claim 1, further comprising: a root member for coupling, the airfoil to the turbine disk; and a platform formed on an upper portion of the root member and configured to receive the airfoil in an oblong cavity formed on an upper surface of the platform.

7. The turbine blade according, to claim 6, wherein the trailing-edge portion of the airfoil of the turbine blade is fixed in the oblong cavity separately from the leading-edge portion.

8. The turbine blade according to claim 1, wherein the rotary unit comprises:

a mounting end coupled to the leading-edge portion of the airfoil of the turbine blade; a servo motor configured to rotate the leading-edge portion of the airfoil of the turbine blade in forward and reverse directions; and a controller configured to control operation of the servo motor according to the inflow angle of the combustion gas.

9. The turbine blade according to claim 8, further comprising: a sensor to measure the inflow angle of the combustion gas at the front surface of the leading-edge portion and to output information indicative of the measured inflow angle to the controller.

10. The turbine blade according to claim 8, wherein the servo motor, under control of the controller, rotates the leading-edge portion according to a flow direction of combustion gas striking the front surface of the leading-edge portion.

11. A turbine for generating driving force to be used for generation of electric power by passing a combustion gas supplied from a combustor, the turbine comprising:

a turbine casing in which the combustion gas flows; and a turbine rotor rotatable inside the turbine casing, the turbine rotor including a plurality of turbine disks and a plurality of turbine blades coupled to an outer surface of each of the plurality of turbine disks, wherein a turbine blade of the plurality of turbine blades comprises:

an airfoil including as separate bodies a trailing-edge portion and a leading-edge portion being linked to the trailing-edge portion and disposed upstream of the trailing-edge portion, the trailing-edge portion including first and second sides opposing each other and forming an open end linked to the leading-edge portion and a closed end having a streamlined shape, the leading-edge portion including a front surface arranged on an upstream side of the leading-edge portion;

a rotary unit connected to the leading-edge portion and configured to rotate the leading-edge portion according to an inflow angle of the combustion gas such that the front surface faces a flow of the combustion gas; and a generally U-shaped barrier wall portion configured to prevent formation of a gap between the open end of the trailing-edge portion and either of a first side surface of the leading-edge portion and a second side surface of the leading-edge portion, the generally U-shaped barrier wall portion comprising:

a first wall having an upstream portion exposed to the combustion gas and protruding axially from the first side surface of the leading-edge portion toward the open end of the trailing-edge portion and including a first distal end and inner and outer surfaces joined at the first distal end, the outer surface of the first wall configured to contact an inside surface of the first side of the trailing-edge portion; and a second wall having an upstream portion exposed to the combustion gas and protruding axially from the second side surface of the leading-edge portion toward the open end of the trailing-edge portion and including a second distal end and inner and outer surfaces joined at the second distal end, the outer surface of the second wall configured to contact an inside surface of the second side of the trailing-edge portion.

12. A gas turbine comprising:

a compressor to produce compressed air by taking in air and compressing the intake air;

a combustor to produce combustion gas by burning a mixture of fuel and the compressed air supplied from the compressor; and a turbine rotatable by the combustion gas supplied from the combustor, the turbine comprising:

a turbine casing in which the combustion gas flows; and a turbine rotor rotatable inside the turbine casing, the turbine rotor including a plurality of turbine disks and a plurality of turbine blades coupled to an outer surface of each of the plurality of turbine disks, wherein a turbine blade of the plurality of turbine blades comprises an airfoil including as separate bodies a trailing-edge portion and a leading-edge portion being linked to the trailing-edge portion and disposed upstream of the trailing-edge portion, the trailing-edge portion including first and second sides opposing each other and forming an open end linked to the leading-edge portion and a closed end having a streamlined shape, the leading-edge portion including a front surface arranged on an upstream side of the leading-edge portion;

a rotary unit connected to the leading-edge portion and configured to rotate the leading-edge portion according to an inflow angle of the combustion gas such that the front surface faces a flow of the combustion gas; and a generally U-shaped barrier wall portion configured to prevent formation of a gap between the open end of the trailing-edge portion and either of a first side surface of the leading-edge portion and a second side surface of the leading-edge portion, the generally U-shaped barrier wall portion comprising:

a first wall having an upstream portion exposed to the combustion gas and protruding axially from the first side surface of the leading-edge portion toward the open end of the trailing-edge portion and including a first distal end and inner and outer surfaces joined at the first distal end, the outer surface of the first wall configured to contact an inside surface of the first side of the trailing-edge portion; and a second wall having an upstream portion exposed to the combustion gas and protruding axially from the second side surface of the leading-edge portion toward the open end of the trailing-edge portion and including a second distal end and inner and outer surfaces joined at the second distal end, the outer surface of the second wall configured to contact an inside surface of the second side of the trailing-edge portion.

* * * * *